May 25, 1937.  H. G. KELLOGG  2,081,587
VEHICLE VENTILATING WINDOW
Filed Aug. 15, 1934  3 Sheets-Sheet 1

INVENTOR
Homer G. Kellogg
BY
Whittemore Hulbert Whittemore Belknap
ATTORNEYS

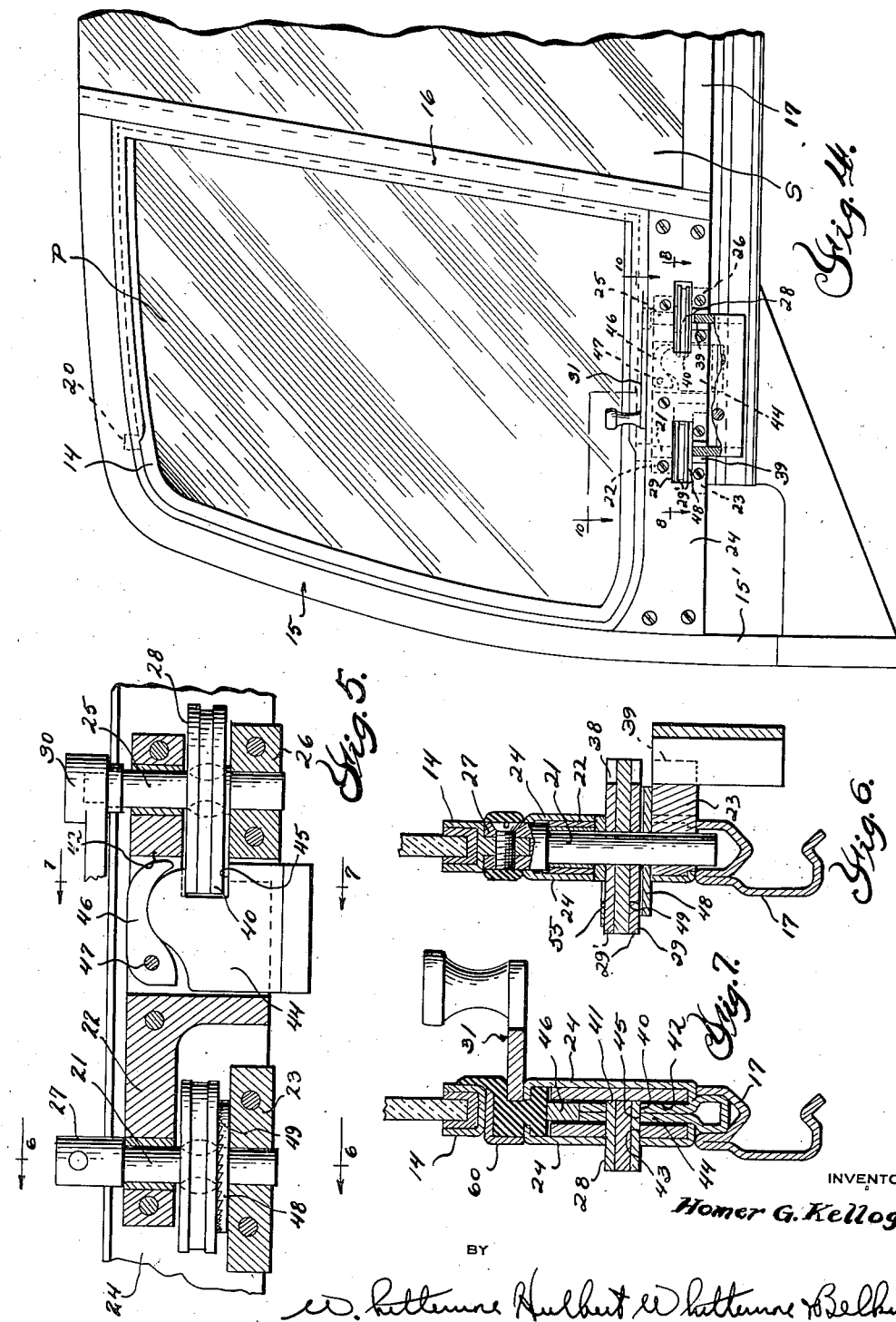

May 25, 1937.  H. G. KELLOGG  2,081,587

VEHICLE VENTILATING WINDOW

Filed Aug. 15, 1934  3 Sheets-Sheet 3

INVENTOR
Homer G. Kellogg
BY
Whittemore Hulbert Whittemore Belknap
ATTORNEYS

Patented May 25, 1937

2,081,587

UNITED STATES PATENT OFFICE 2,081,587

VEHICLE VENTILATING WINDOW

Homer G. Kellogg, Detroit, Mich., assignor to Motor Products Corporation, Detroit, Mich., a corporation of New York Application August 15, 1934, Serial No. 740,013

9 Claims. (Cl. 296—44)

This invention relates to vehicle ventilating windows and more especially to ventilating window constructions designed for use in the closed bodies of motor vehicles and the like. The invention relates particularly to that type of ventilating windows in which the normal forward motion of the vehicle is utilized to ventilate the interior of the vehicle without producing objectionable drafts.

One of the important objects of this invention is to provide a ventilating window structure of this character embodying pivoted and sliding panels operable independently of one another in effecting the control of the ventilation of the vehicle and having a single control means for angularly adjusting the pivoted panel; securing the pivoted panel in registration with the window opening; and coupling the window lifter mechanism with the pivoted panel for vertical sliding movement thereby.

In accordance with this invention the control handle for angularly adjusting the pivoted panel also actuates the means for coupling and uncoupling the pivoted panel with the window lifter mechanism and for securing the pivoted panel to the window casing in registration with the window opening so that all of these mechanisms are actuated by a single control means thus rendering the operation of the ventilating window structure simple and foolproof.

Other objects and advantages of the invention result from the novel combination, construction and arrangement of parts, all of which will be made more apparent as this description proceeds, especially when considered in connection with the accompanying drawings, wherein Figure 1 is a fragmentary perspective view of a portion of the motor vehicle looking from the interior thereof showing the same equipped with my improved ventilating window;

Figure 4 is a fragmentary sectional elevational view of the pivoted panel of the ventilating window as seen from the inside of the vehicle;

Figure 5 is a fragmentary vertical sectional view through the lower portion of the frame of the pivoted panel;

Figure 6 is an enlarged vertical sectional view taken substantially on the plane indicated by line 6—6 of Figure 5;

Figure 7 is a similar view taken substantially on the plane indicated by line 7—7 of Figure 5;

Figure 1:
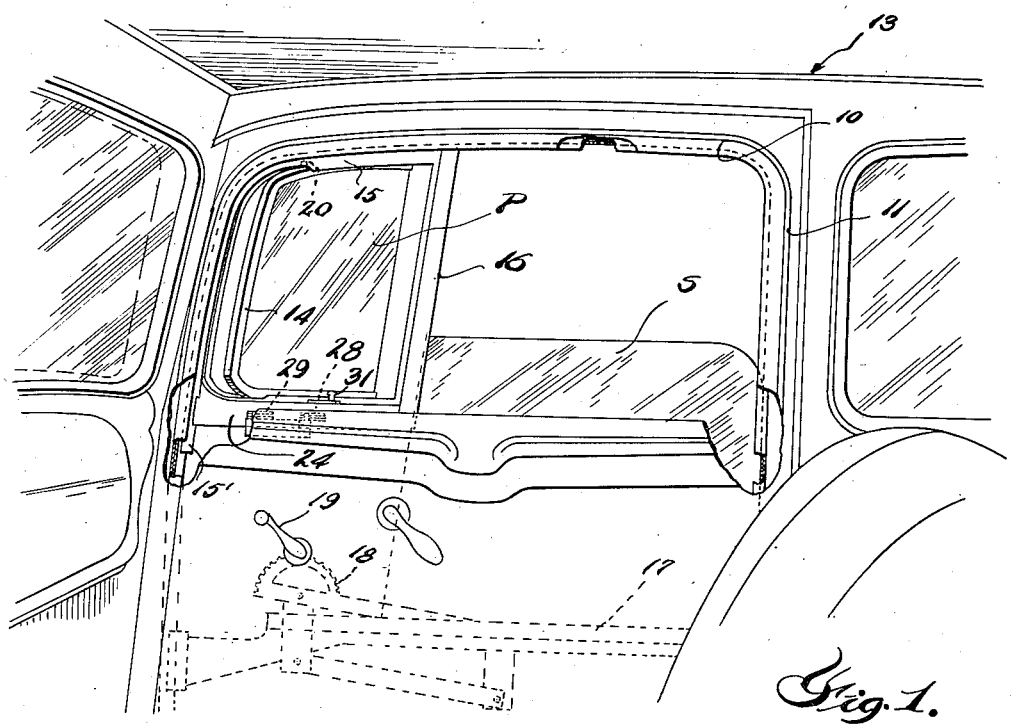
Figures 2, 3:
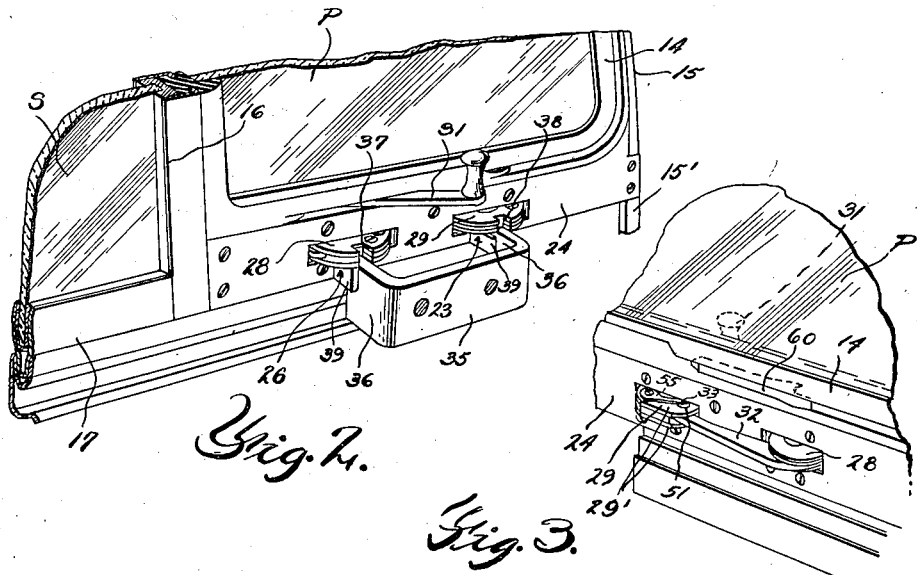
Figure 2 is an enlarged fragmentary perspective view of the ventilating window structure.
Figure 3 is a view similar to Figure 2 looking from the opposite side.

The present invention comprises broadly a ventilating window structure including a pivoted panel P and a sliding panel S adapted to cooperate to close a window opening 10 formed in the window casing 11 of, for instance, the door 12 of a motor vehicle or the like 13. Means is also provided for operating the pivoted and sliding panels independently of one another and for also raising and lowering the pivoted and sliding panels as a unit.

The pivoted panel P may be provided with a frame 14 and mounted on substantially vertical pivots located intermediate the vertical edges of the panel, on a frame 15. This frame 15 usually has an extension 15' slidable in the usual glass channel at one edge of the door and is also formed with a vertically arranged frame member 16 which is engaged by the adjacent edge of the pivoted panel P in the closed position of the latter and is grooved to slidably receive and support the edge of the sliding panel S. It will be understood that the opposite edge of the sliding panel S engages the usual glass channel at the other edge of the door. The reference character 17 indicates the customary glass retainer secured to the lower edge of the sliding panel S and with which the usual roller or rollers on the lifter arm of the window lifter mechanism 18 engages to raise and lower the sliding panel. The window lifter mechanism is actuated by the usual operating handle 19. Inasmuch as all of this may be of conventional or standard construction it will not be described herein in detail.

However, it suffices to state at this time that means is provided for coupling the frame 15—16 together with the pivoted panel P to the glass retainer 17 so that both the pivoted and sliding panels may be raised and lowered as a unit, means being also provided for uncoupling the sliding panel from the lifter mechanism and securing the same to the window casing or door structure in registration with the window opening so that the pivoted panel may be angularly adjusted and the sliding panel S raised and lowered independently thereof as desired.

By reference to Figure 1, it will be noted that the upper pivot for the pivoted panel P is designated by the reference character 20, and by reference particularly to Figures 5 and 6 it will be noted that the lower pivot is designated by the reference character 21 and is in the form of a shaft rotatably journaled adjacent its upper end in a casting 22 and adjacent its lower end in a block 23, which casting and block are secured and arranged between a pair of plates 24 forming the lower boundary of the frame 15—16.

Also rotatably journaled in the casting 22 is a shaft 25, the lower end of which is rotatably journaled in a block 26 also secured between the said plates 24.

Secured to the upper end of the pivot shaft 21 is a bracket 27 which is rigidly secured to the frame of the pivoted panel P so that when rotary movement is applied to the shaft 21 the pivoted panel will be swung about its pivots 20—21, as will be obvious.

Keyed on the shaft 25 is a disk-shaped supporting member 28, and keyed on the shaft 21 is a disk-shaped supporting member 29. Also keyed to the upper end of the shaft 25 is the hub 30 of an operating or control handle 31.

Rotary movement is imparted to the disk member 29, and consequently to the pivot shaft 21, upon rotation of the shaft 25 and disk member 28, by means of a link 32 pivotally connected as at 33 to the disk member 29 and as at 34 to the disk member 28. The end of the link connected to the disk member 28 is curved so as to extend partly around the axis of rotation 25 of the disk member 28 and to thus offset this pivot 34 from the longitudinal center of the link 32 so that during the last part of the movement of the disk member 28 in one direction the pivot 34 is moved past the plane which intersects the pivots 25 and 33 thus locking these parts in this position which is the closed position of the pivoted panel P.

Mounted on the inner surface of the inner panel of the door or other stationary structure is a supporting bracket 35 here shown as a substantially U-shaped member having a pair of spaced legs 36. These legs 36 extend inwardly normally in the path of movement of the disk members 28 and 29 and in one position of the disk members are adapted to register with slots 37 and 38 formed respectively in the disk members 28 and 29. With the slots 37 and 38 registering with the legs 36 of the supporting bracket the pivoted panel P and its associated frame may be raised and lowered, but when the disk members 28 and 29 have been rotated slightly to bring the slots 37 and 38 out of registration with the legs of the bracket member, the pivoted panel will be rigidly supported in the window casing or door structure with the pivoted panel in registration with the window opening thereof.

The blocks 23 and 26 heretofore referred to are preferably each provided with a pair of spaced projections 39 which project outwardly through openings in the finish plate 24 and are adapted to engage the legs 36 of the supporting bracket at the end of the upward movement of the sliding panel and at the beginning of the downward movement thereof to cause proper registration of the parts, as will be readily apparent.

The disk member 28 is provided with an extension 40 ending in an abrupt face forming a shoulder 41. This extension 40 projects into a vertically extending slot 42 formed in the casting 22 (see Figures 5, 7 and 8) through a lateral slot 43 formed in the casting.

In order to couple the frame of the pivoted panel with the retainer 17 a coupling member 44 is secured to the retainer 17 which is adapted, when the retainer 17 and as a consequence the sliding panel S is in its fully raised position, to bring a slot 45 of the coupling member 44 into registration with the extension 40 of the disk member 28. When these parts are in registration a rotation of the disk member 28 will bring the extension 40 in engagement with the slots 45 of the coupling member 44 and thus secure the pivoted panel frame to the retainer 17 of the window lifter mechanism so that upon subsequent operation of the lifter mechanism the pivoted panel P may be raised and lowered with the sliding panel as a unit.

Means must be provided for preventing this last coupling movement of the disk 28 until the coupling member 44 is brought into proper registration with the disk 28, and to accomplish this I provide a stop or latch member 46 pivoted in the slot 42 as at 47 and adapted to normally rotate by gravity about its pivot 47 to position the free end of this latch member in the path of movement of the shoulder 41 of the disk 28. This latch 46 therefore prevents further rotary movement of the disk member 28 until the latch is raised out of position by the upward movement of the coupling member 44 (see Figure 5). As a result of this construction, the pivoted panel P cannot be fully closed and coupled with the window lifter mechanism until the retainer 17, and as a consequence the sliding panel S, have been fully raised into registration with the window opening.

The pivoted panel P cannot be swung to open position until the said panel is in full registration with the window opening because the operating handle 31 does not clear the upper surface of the reveal line molding at the lower edge of the window until the pivoted panel is in registration with the window opening. Moreover, the slots 38 and 39 of the supporting disks 29 and 28 do not clear the upper edge of the supporting bracket 35 until the pivoted panel is in full registration with the window opening.

In order to hold the pivoted panel against accidental closing movement due to air pressure resulting from the forward travel of the vehicle, I have provided an automatically controlled ratchet mechanism for holding the pivoted panel in its outward adjusted position against the action of this air pressure. This construction can be probably best understood by reference to Figures 3, 5, 8, 9, 11 and 12.

Fixed with reference to the rotary pivot shaft 21 is a ratchet disk 48 having a series of ratchet teeth 49 on its upper face. The ratchet teeth 49 are adapted to be engaged by the tooth or teeth 50 on the end of a latching pin 51 which constitutes the pivotal connection 33 of the link 32 heretofore referred to. This latching pin 51 is mounted for limited vertical sliding movement in the spaced disks 29' of the disk member 29. The end of link 32 extends between these two disks 29' and is provided with an opening 52 through which the latch pin 51 extends. This opening is slightly larger than the latch pin 51 and is provided with an annular beveled surface 53 which engages a beveled surface 54 on the latch pin 51. Some means such as a flat leaf spring 55 is provided which engages the latch pin 51 to normally urge the same downwardly into engagement with the ratchet teeth 49 of the ratchet disk. The ratchet pin is shown in engagement with the ratchet teeth in Figure 11 and out of engagement therewith in Figure 12.

When the disk member 28 is rotated, the movement is of course transmitted to the link 32 and causes a slight shifting movement between the end of the link and the latch pin 51 which causes an engagement of the beveled surfaces 53 and 54 to lift the ratchet pin 51 against the action of the spring 55 to thus cause the same to clear the ratchet teeth 49. While the ratchet teeth 49 face only in a direction to prevent closing movement of the pivoted panel, nevertheless when movement is transmitted to the link 32 in either direction by means of the control handle 31 the ratchet pin 51 is disengaged from the ratchet teeth. When, however, the pivoted panel has been angularly adjusted to any of its open positions and the handle 31 released, the spring 55 will force the ratchet pin 51 downwardly into engagement with the ratchet teeth and prevent closing movement of the pivoted panel until the same is operated by the control handle 31. However, after the opening movement of the panel has been started by the handle 31 the panel may be further adjusted in a direction to open the same by merely pushing on the pivoted panel as during this movement the ratchet pin 51 will ride over the ratchet teeth 49.

In order to additionally secure the pivoted panel P in closed position against unauthorized opening, the lower horizontal portion of the frame 14 of the pivoted panel is provided with two downwardly extending pins 56 and 57. The pin 56 is in vertical alignment with the shaft 25 of the operating handle 31 and is adapted to be engaged in a recess 58 formed in the upper face of the hub portion 39 of the handle 31 as shown probably most clearly in Figure 10. Thus as the pivoted panel approaches closed position the pin 56 is engaged in the recess 58 in the hub of the control handle and the panel is thus securely locked in position, it being understood that the pin 56 is spaced from the pivot 21 of the panel. The pin 57 is arranged slightly spaced from the axis of the control handle and it is engaged by one of the fingers 59 defining the sides of the recess 58 so that as the handle is swung in the direction to open the pivoted panel this finger 59 engages the pin 57 to push the panel towards open position. This assists in bringing the pivot 34 on the other side of the plane extending between the pivots 25 and 33 of the link and disks so that the further open movement of the panel is facilitated. The lower frame of the panel is preferably provided with a guard 60 on the outside which prevents any unauthorized manipulation of the control handle 31 from the exterior of the vehicle.

Figure 8:
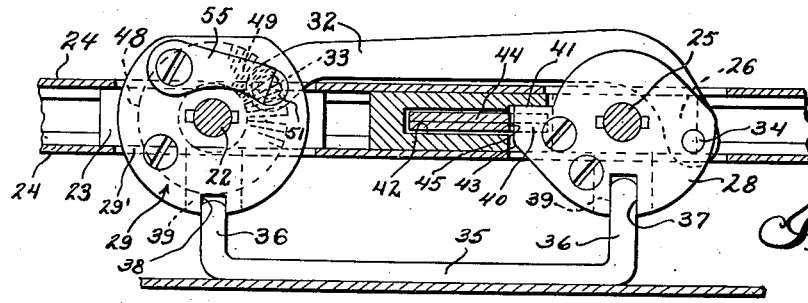
Figure 8 is a fragmentary sectional view taken substantially on the plane indicated by line 8—8 of Figure 4.
Figures 9, 10:
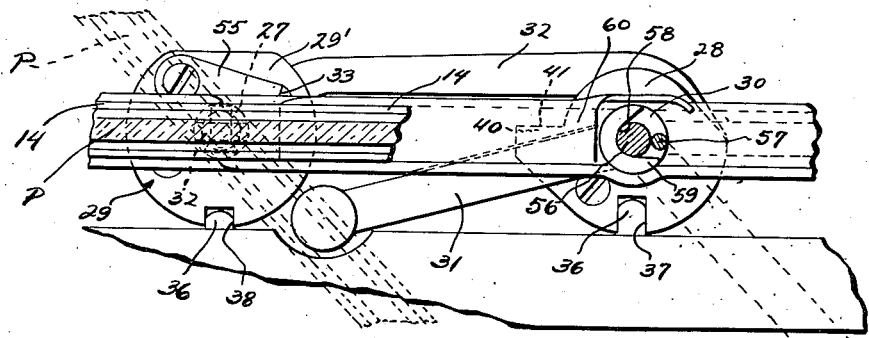
Figure 9 is a view substantially similar to Figure 8 with the parts in the position they assume with the pivoted panel open.
Figure 10 is a similar view taken substantially on the plane indicated by line 10—10 of Figure 4.
Figures 11, 12:
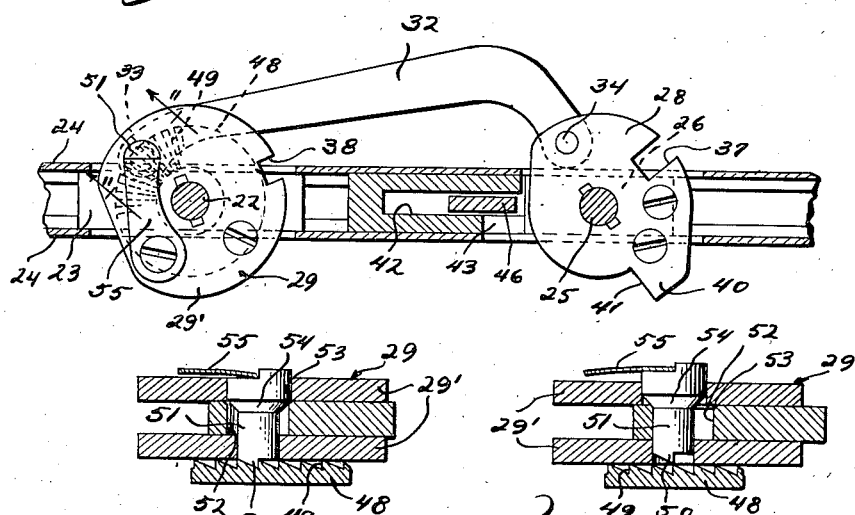
Figure 11 is a detail sectional view taken substantially on the plane indicated by line 11—11 of Figure 9.
Figure 12 is a similar view showing the parts in different position.

As previously mentioned, the location of the pivotal connections between the link 32 and the supporting disk members 28 and 29 effects a locking of the pivoted panel in closed position, as a comparison of Figures 8 and 9 will probably most clearly indicate. By reason of the location of the pivot 34 the last portion of the rotative movement of the shaft and disk 25 and 28 will not cause a further rotation of shaft 21, and as a consequence, after the pivoted panel has been fully closed the further rotation of the shaft and disk 25 and 28 will move the pivot 34 beyond the plane extending between the pivots 25 and 33 to thus securely lock these parts in this position.

From the foregoing description, it will be apparent that with the present construction the pivoted panel may be angularly adjusted; may be secured to the window casing in registration with the window opening; and may be released therefrom and coupled to the window lifter mechanism all by the operation of a single control lever. Assuming that the pivoted panel and sliding panel are coupled together and in the well of the door, both panels may be raised by operating the customary window lifter mechanism. When the panels are in complete registration with the window opening, the operation of the control handle will uncouple the pivoted panel from the window lifter mechanism and secure the same to the window casing or stationary part of the door, these two operations being accomplished before the panel has been angularly adjusted sufficiently to open the same. Thereafter the sliding panel may be raised and lowered as desired, and the pivoted panel may be angularly adjusted from a completely closed position to a completely open position. When it is again desired to couple the panels together for movement out of the window opening down into the well the sliding panel is raised and thereafter the pivoted panel is moved to completely closed position, which movement of the control handle also couples the pivoted panel to the window lifter mechanism.

Sufficient safeguards against incorrect operation and unauthorized operation from the exterior of the vehicle are provided to make the structure commercially practical and satisfactory.

While an embodiment of the invention has been described and illustrated herein somewhat in detail, it will be readily apparent to those skilled in this art that various changes in many of the non-essential details may be resorted to without departing from the spirit and scope of this invention, and to this end reservation is made to make such changes as may come within the purview of the accompanying claims.

What I claim as my invention is:

1. A ventilating window construction for a vehicle body comprising a window casing having a window opening therein, a slidable panel pivotally mounted in said casing on vertically arranged pivots for swinging movement out of the plane thereof, a window lifter mechanism, a rotatively mounted disk member, said casing having a fixed part constituting a support, a coupling member carried by said lifter mechanism, means connecting said disk member to said panel for angularly adjusting the latter upon rotation of said disk member, and a panel adjusting lever connected to said disk member for rotating the latter, said disk member upon rotation being selectively engageable with said support and the coupling member of said lifter mechanism.

2. A ventilating window construction for a vehicle body comprising a window casing, a frame slidable in said casing into and out of registration with the window opening thereof, a panel pivotally mounted in said frame on substantially vertically arranged pivots, a window lifter mechanism, said casing having a fixed part constituting a support, a pair of disk members rotatably mounted on said frame, one of the same being secured to one of the pivots of said panel, means for connecting said disk members whereby the movement of one is imparted to the other, a panel adjusting lever connected to one of said disk members for rotating the same, said disk members being adapted to be rotated into and out of engagement with said support whereby said panel may be secured to said casing in registration with said window opening or released therefrom, and a coupling member carried by said lifter mechanism engageable by one of said disk members for coupling said panel to said lifter mechanism.

3. A ventilating window construction for a vehicle body comprising a window casing, a frame slidable in said casing into and out of registration with the window opening thereof, a panel pivotally mounted in said frame on substantially vertically arranged pivots, a window lifter mechanism, said casing having a fixed part constituting a support, a pair of disk members rotatably mounted on said frame, one of the same being secured to one of the pivots of said panel, means for connecting said disk members whereby the movement of one is imparted to the other, a panel adjusting lever connected to one of said disk members for rotating the same, said disk members being adapted to be rotated into and out of engagement with said support whereby said panel may be secured to said casing in registration with said window opening or released therefrom, a coupling member carried by said lifter mechanism engageable by one of said disk members for coupling said panel to said lifter mechanism, and means carried by one of said disk members engageable with a ratchet for holding said panel in its adjusted positions.

4. A ventilating window construction for a vehicle body comprising a window casing, a frame slidable in said casing into and out of registration with the window opening thereof, a panel pivotally mounted in said frame on substantially vertically arranged pivots, a window lifter mechanism, a ratchet and latching pin associated with said pivoted panel for holding the same in adjusted position, a panel adjusting lever, and means actuated upon movement of said panel adjusting lever for disengaging said latching pin to permit movement of said panel.

5. A ventilating window construction for a vehicle body comprising a window casing, a frame slidable in said casing into and out of registration with the window opening thereof, a panel pivotally mounted in said frame on substantially vertically arranged pivots, a window lifter mechanism, a fixed ratchet member, a latching pin associated with said pivoted panel and engaging said ratchet member for holding said pivoted panel in adjusted position, a panel adjusting lever, and means operable upon movement of said panel adjusting lever for releasing said ratchet pin from said ratchet member to permit movement of said pivoted panel.

6. A ventilating window construction for a vehicle body comprising a window casing, a frame slidable in said casing into and out of registration with the window opening thereof, a panel pivotally mounted in said frame on substantially vertically arranged pivots, a window lifter mechanism, a rotatable disk member carried by one of the pivots of said pivoted panel, a second disk member rotatably mounted on said frame, a link connecting said second disk member to said first disk member to rotate the latter upon rotation of the former, a panel adjusting lever connected to said second disk member for rotating the same, said casing having a fixed part forming a support engageable by said disk members to secure said frame and panel in registration with the window opening, said disk members being movable to a position free of said support whereby said frame and panel may be moved out of registration with the window opening, and a coupling member carried by said lifter mechanism engageable by one of said disk members in the last mentioned position of these parts whereby said frame and panel may be coupled to said lifter mechanism for sliding movement thereby.

7. A ventilating window construction for a vehicle body comprising a window casing, a frame slidable in said casing into and out of registration with the window opening thereof, a panel pivotally mounted in said frame on substantially vertically arranged pivots, a window lifter mechanism, a disk member associated with one of the pivots of said pivoted panel, a second disk member rotatably mounted on said frame, a panel adjusting lever connected to said second disk member for rotating the same, a link pivotally connecting said disk members having a pivoted connection with said second disk located beyond the axis of said disk and shiftable past dead center to lock said disk members in one position, and a panel adjusting lever connected to said second disk for rotating the same.

8. A ventilating window construction for a vehicle body comprising a window casing, a frame slidable in said casing into and out of registration with the window opening thereof, a panel pivotally mounted in said frame on substantially vertically arranged pivots, a window lifter mechanism, a disk member rotatably mounted on said frame, a fixed support engageable by said disk member for securing said frame in registration with the window opening, a coupling member carried by said window lifter mechanism and engageable by said disk for coupling said frame to said lifter mechanism, a latch member preventing rotation of said disk member into coupling position until released by said coupling member upon movement of said coupling member to coupling position, and a panel adjusting member for rotating said disk member.

9. A ventilating window construction for a vehicle body comprising a window casing, a frame slidable in said casing into and out of registration with the window opening thereof, a panel pivotally mounted in said frame on substantially vertically arranged pivots, a window lifter mechanism, a lever for adjusting said pivoted panel, a projection on said panel engageable by said lever in the closed position of said panel for securing the latter in closed position, and means on said handle engaging a portion of said panel for initiating the opening movement of said panel.

HOMER G. KELLOGG.